United States Patent
Murata et al.

(10) Patent No.: US 11,555,134 B2
(45) Date of Patent: Jan. 17, 2023

(54) ACRYLIC POLYSILOXANE RESIN COATING COMPOSITIONS AND USES THEREOF

(71) Applicant: CHUGOKU MARINE PAINTS, LTD., Otake (JP)

(72) Inventors: Hiroaki Murata, Otake (JP); Keisuke Nakatani, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 434 days.

(21) Appl. No.: 16/767,756

(22) PCT Filed: Nov. 12, 2018

(86) PCT No.: PCT/JP2018/041784
§ 371 (c)(1),
(2) Date: May 28, 2020

(87) PCT Pub. No.: WO2019/107124
PCT Pub. Date: Jun. 6, 2019

(65) Prior Publication Data
US 2020/0291265 A1    Sep. 17, 2020

(30) Foreign Application Priority Data

Nov. 30, 2017 (JP) .............................. JP2017-230409

(51) Int. Cl.
| | | |
|---|---|---|
| *C09D 183/08* | (2006.01) | |
| *C09D 5/08* | (2006.01) | |
| *C08F 220/20* | (2006.01) | |
| *C08F 236/02* | (2006.01) | |
| *C08F 236/22* | (2006.01) | |
| *C08G 77/26* | (2006.01) | |
| *C08G 77/28* | (2006.01) | |
| *C08G 18/75* | (2006.01) | |

(52) U.S. Cl.
CPC .......... *C09D 183/08* (2013.01); *C08F 220/20* (2013.01); *C08F 236/02* (2013.01); *C08F 236/22* (2013.01); *C08G 18/755* (2013.01); *C08G 77/26* (2013.01); *C08G 77/28* (2013.01); *C09D 5/08* (2013.01); *C08F 2810/00* (2013.01)

(58) Field of Classification Search
CPC ....... C09D 183/08; C09D 5/08; C08F 220/20; C08F 236/02; C08F 2810/00; C08F 236/22; C08G 18/755; C08G 77/26; C08G 77/28
USPC ...................................................... 106/287.1
See application file for complete search history.

(56) References Cited

U.S. PATENT DOCUMENTS

| | | | |
|---|---|---|---|
| 5,827,928 A | 10/1998 | Morimoto et al. | |
| 6,281,321 B1 * | 8/2001 | Kelly ................... | C09D 183/10 106/287.15 |
| 10,356,585 B2 | 7/2019 | Kuo et al. | |

FOREIGN PATENT DOCUMENTS

| | | | | |
|---|---|---|---|---|
| CN | 101235229 A | | 8/2008 | |
| CN | 102321399 A | | 1/2012 | |
| EP | 0 737 726 A1 | | 10/1996 | |
| JP | 63-54412 A | | 3/1988 | |
| JP | 10-120745 A | | 5/1998 | |
| JP | 2003-327912 A | | 11/2003 | |
| JP | 2009-96825 A | | 5/2009 | |
| KR | 10-2004-0085003 A | | 10/2004 | |
| KR | 10-2009-0057597 A | | 6/2009 | |
| KR | 20090057597 A | * | 6/2009 | |
| KR | 10-2015-0128672 A | | 11/2015 | |
| WO | WO 98/23691 A1 | | 6/1998 | |
| WO | WO 2007/059071 A1 | | 5/2007 | |
| WO | WO-2007059071 A1 | * | 5/2007 | ........... C08G 18/289 |

OTHER PUBLICATIONS

English translation of International Search Report dated Jan. 15, 2019 in PCT/JP2018/041784, 2 pages.
Korean Decision to Grant dated Aug. 24, 2022 in Korean Patent Application No. 10-2020-7015719, 2 pages.
Combined Chinese Office Action and Search Report dated Mar. 9, 2021 in Chinese Patent Application No. 201880076193.5, 5 pages.

* cited by examiner

*Primary Examiner* — Kelechi C Egwim
(74) *Attorney, Agent, or Firm* — Oblon, McClelland, Maier & Neustadt, L.L.P.

(57) ABSTRACT

An object of the present invention is to provide a coating composition capable of forming a coating film which can maintain its appearance and gloss over a long period and which has high film hardness and high flexibility and exhibits excellent adhesion with respect to an epoxy resin anticorrosive coating film. An acrylic polysiloxane resin coating composition of the invention includes (A) a silicone resin, (B) a compound having one or more functional groups capable of undergoing Michael addition reaction with an unsaturated double bond in an acryloyloxy group, and having one or more alkoxy groups bonded to silicon, (C) a trifunctional or polyfunctional aliphatic urethane acrylate oligomer having a cyclic structure, and (D) a bifunctional acrylate monomer having no ether structures (except an ether structure in an acryloyloxy group) and no aromatic rings, the mass ratio of the total amount of (A) and (B) to the total amount of any acrylate oligomer(s) and any acrylate monomer(s) being 40:60 to 70:30.

11 Claims, No Drawings

ACRYLIC POLYSILOXANE RESIN COATING COMPOSITIONS AND USES THEREOF

TECHNICAL FIELD

The present invention relates to acrylic polysiloxane resin coating compositions and uses thereof.

BACKGROUND ART

Conventionally, (large-scale) iron or steel structures such as ships, bridges, tanks, plants, marine buoys and pipelines are coated with various types of paints which impart functions such as corrosion resistance. For example, an epoxy resin anticorrosive coating composition is applied to protect from corrosion, and the anticorrosive coating film is overcoated with a topcoat coating composition for the purpose of enhancing design and weather resistance.

Some exemplary topcoat coating compositions are two-part reactive curable topcoat coating compositions (e.g., acrylic urethane resin coating compositions and fluorourethane resin coating compositions). A two-part reactive curable composition forms a coating film by the curing reaction between the hydroxyl groups in a resin contained in the base resin component, and the isocyanate groups in an isocyanate compound contained in the curing agent component. That is, the two-part reactive curable compositions contain free isocyanate groups which are harmful to the human body, and also need to contain a solvent component for controlling the coating viscosity. Due to these facts, the coating compositions exert significant impacts on the human body and the environment at the time of the coating process.

Human and environmentally friendly topcoat coating compositions which contain no free isocyanate groups are known. Specific examples of such topcoat coating compositions include polysiloxane resin coating compositions. Regarding the polysiloxane resin coating compositions, Patent Literature 1 discloses an acrylic polysiloxane resin coating composition containing an acrylate, a polysiloxane and an aminosilane.

CITATION LIST

Patent Literature

Patent Literature 1: WO 1998/23691

SUMMARY OF INVENTION

Technical Problem

The present inventors have found that coatings formed from conventional acrylic polysiloxane resin coating compositions, when they are subjected to long-term exposure to environments where solar radiation is plenty and UV light is intense, are deteriorated in properties and become brittle to incur appearance problems such as cracks on the surface of the coating films.

The present inventors have also found that when an epoxy resin anticorrosive coating film is formed as an undercoat film and is thereafter overcoated with an acrylic polysiloxane resin coating film as a topcoat film, the adhesion of the topcoat film with respect to the undercoat film tends to be lowered with increasing time between the coating processes (the coating interval).

Incidentally, an epoxy resin anticorrosive coating film is usually overcoated with a topcoat paint with a predetermined time interval. In particular, the time interval between the undercoating process and the topcoating process (the coating interval) is usually about 1 day to 90 days for ship coating compositions. Thus, it is demanded that the adhesion (the interval adhesion) be not lowered even when the coating interval is as long as 90 days.

While polysiloxane resin coating compositions can generally form coating films with high film hardness, the coating films are poor in flexibility such as crack resistance and flex resistance. Concurrent satisfaction of film hardness and flexibility is demanded.

An object of the present invention is to provide a coating composition capable of forming a coating film which can maintain its appearance and gloss over a long period even when exposed to environments where solar radiation is plenty and UV light is intense, and which has high film hardness and high flexibility and exhibits excellent adhesion, in particular interval adhesion, with respect to an epoxy resin anticorrosive coating film.

Technical Solution

The present inventors carried out extensive studies directed to solving the problems discussed above. As a result, the present inventors have found that coating compositions having the configurations described below can solve the problems, thus completing the present invention.

The present invention pertains to the following [1] to [11].

[1] An acrylic polysiloxane resin coating composition comprising (A) a silicone resin, (B) a compound having one or more functional groups capable of undergoing Michael addition reaction with an unsaturated double bond in an acryloyloxy group, and having one or more alkoxy groups bonded to silicon, (C) a trifunctional or polyfunctional aliphatic urethane acrylate oligomer having a cyclic structure, and (D) a bifunctional acrylate monomer having no ether structures (except an ether structure in an acryloyloxy group) and no aromatic rings, the mass ratio of the total amount of the silicone resin (A) and the compound (B) to the total amount of any acrylate oligomer(s) and any acrylate monomer(s) (A+B:acrylate oligomer(s)+acrylate monomer(s)) being 40:60 to 70:30.

[2] The acrylic polysiloxane resin coating composition described in [1], wherein the functional group capable of undergoing Michael addition reaction in the compound (B) is a primary or secondary amino group.

[3] The acrylic polysiloxane resin coating composition described in [1] or [2], wherein the weight average molecular weight (Mw) of the oligomer (C) is 700 to 6,000.

[4] The acrylic polysiloxane resin coating composition described in any one of [1] to [3], wherein the monomer (D) is at least one selected from alkanediol diacrylates and alicyclic skeleton-containing diacrylates.

[5] The acrylic polysiloxane resin coating composition described in any one of [1] to [4], wherein the mass ratio of any acrylate oligomer(s) to any acrylate monomer(s) in the composition (acrylate oligomer(s):acrylate monomer(s)) is 60:40 to 75:25.

[6] A coating film formed from the acrylic polysiloxane resin coating composition described in any one of [1] to [5].

[7] The coating film described in [6] wherein the minimum diameter of a mandrel determined with respect to the coating film with a dry film thickness of 100 μm in accordance with JIS K5600-5-1:1999 is not more than 10 mm.

[8] The coating film described in. [6], wherein the minimum diameter of a mandrel determined with respect to the coating film with a dry film thickness of 100 µm in accordance with JIS K5600-5-1:1999 is not more than 4 mm.

[9] A substrate with a coating film comprising a substrate and the coating film described in any one of [6] to [8].

[10] The substrate with a coating film described in [9], wherein the substrate is an iron or steel structure.

[11] A method for producing a substrate with a coating film, comprising a step of applying the acrylic polysiloxane resin coating composition described in any one of [1] to [5] to a substrate, and a step of forming a coating film by drying the coating composition applied.

Advantageous Effects of Invention

The coating composition provided according to the present invention is capable of forming a coating film which can maintain its appearance and gloss over a long period even when exposed to environments where solar radiation is plenty and UV light is intense, and which has high film hardness and high flexibility and exhibits excellent adhesion, in particular interval adhesion, with respect to an epoxy resin anticorrosive coating film. By the use of the coating composition of the present invention, a topcoat film can be formed which exhibits the excellent adhesion with respect to an epoxy resin anticorrosive coating film as an undercoat film.

DESCRIPTION OF EMBODIMENTS

Embodiments of the present invention will be described in detail hereinbelow.

[Acrylic Polysiloxane Resin Coating Compositions]

An acrylic polysiloxane resin coating composition of the present invention (hereinafter, also written as the "coating composition") includes a silicone resin (A), a compound (B) having one or more functional groups capable of undergoing Michael addition reaction with an unsaturated double bond in an acryloyloxy group, and having one or more alkoxy groups bonded to silicon, a trifunctional or polyfunctional aliphatic urethane acrylate oligomer (C) having a cyclic structure, and a bifunctional acrylate monomer (D) having no ether structures (except an ether structure in an acryloyloxy group) and no aromatic rings.

In the following description, the components will be also written as "components (x)" (x is the corresponding alphabetical letter). For example, the silicone resin (A) will be also written as the "component (A)".

⟨ Silicone Resins (A)⟩

For example, the silicone resin (A) may be a compound which has reactive groups (e.g., alkoxy groups or silanol groups) on the siloxane bonds in the molecule and is polymerized or forms a three dimensionally crosslinked structure and is cured by the reaction between the reactive groups or by the reaction of the reactive groups with reactive groups in at least one compound selected from the component (B), a Michael addition product of the components (B) and (C), and a Michael addition product of the components (B) and (D). The reaction may be, for example, condensation reaction or addition reaction. Examples of the condensation reactions include dehydration reaction and dealcoholization reaction.

The component (A) may be linear or branched.

For example, the component (A) preferably has a structural unit represented by the formula (AI):$R^1_2SiO_{2/2}$, and more preferably further has a structural unit represented by the formula (AII):$R^1SiO_{3/2}$. The component (A) may be a compound represented by the formula (AIII) below:

[Chem. 1]

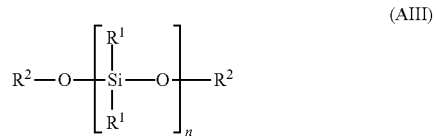

In the formulae (AI) to (AIII), $R^1$ independently at each occurrence is a C1-C8 alkyl group, a C6-C8 aryl group, a C1-C8 alkoxy group or a C6-C8 aryloxy group. In the formula (AIII), $R^2$ independently at each occurrence is a C1-C8 alkyl group, a C6-C8 aryl group or a hydrogen atom. The n denotes the number in which the units are repeated. The n is usually selected so that the weight average molecular weight (Mw) of the silicone resin (A) will be in the range of 400 to 5,000, and preferably 500 to 3,000.

Examples of the C1-C8 alkyl groups represented by $R^1$ and $R^2$ include methyl group, ethyl group, propyl group, butyl group and pentyl group. The C6-C8 aryl groups represented by $R^1$ and $R^2$ may be groups having a substituent such as an alkyl group on the aromatic ring, with examples including phenyl group, methylphenyl group and dimethylphenyl group. Examples of the C1-C8 alkoxy groups represented by $R^1$ include methoxy group, ethoxy group and propoxy group. Examples of the C6-C8 aryloxy groups include phenoxy group.

The component (A) is preferably a silicone resin having any of the formulae (AI) to (AIII) in which the groups $R^1$ are at least one selected from methyl group, ethyl group, propyl group, phenyl group, methoxy group, ethoxy group, propoxy group and phenoxy group, or is preferably a silicone resin of the formula (AIII) in which the groups $R^2$ are at least one selected from methyl group, ethyl group and phenyl group.

From the point of view of the compatibility with other compounds, the component (A) is preferably a silicone resin having a refractive index at 25° C. of not less than 1.500. Here, the upper limit of the refractive index is, for example, 1.600.

The component (A) preferably has a unit containing an alkoxy group or an aryloxy group (for example, a unit of the formula (AI) or (AII) in which at least one $R^1$ is an alkoxy group or an aryloxy group). The content proportion of the alkoxy groups or the aryloxy groups in the component (A) is preferably 5 to 40 mass %, more preferably 10 to 25 mass %, and still more preferably 15 to 20 mass %.

The component (A) is preferably a methylphenylsilicone resin or phenylsilicone resin which contains an alkoxy group.

For example, the methylphenylsilicone resin has a dimethylsiloxane unit (a1) and a diphenylsiloxane unit (a2) represented by the formulae below, and preferably further has at least one structural unit selected from a monomethylsiloxane unit (a3) and a monophenylsiloxane unit (a4) represented by the formulae below. For example, the phenylsilicone resin has a diphenylsiloxane unit (a2), and preferably further has a monophenylsiloxane unit (a4).

[Chem. 2]

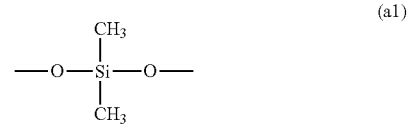

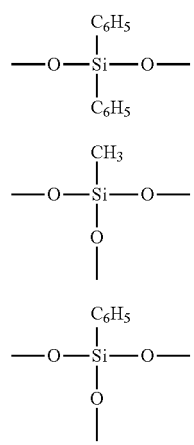

The weight average molecular weight (Mw) of the component (A) measured by gel permeation chromatography (GPC) relative to standard polystyrenes is usually 400 to 5,000, preferably 500 to 3,000, and more preferably 1,000 to 2,000. This configuration allows for easy control of coating properties and coating film performance, and ensures that topcoat films that are obtained will attain excellent weather resistance and flexibility.

Details of the Mw measurement conditions are described below.

Apparatus: "Alliance 2695" (manufactured by Waters Corporation)

Columns: One "TSKgel Super H4000" column and two "TSKgel Super H2000" columns are connected together (all columns manufactured by TOSOH CORPORATION, 6 mm in inner diameter×15 cm in length)

Eluent: Tetrahydrofuran 99% (stabilized with BHT)
Flow rate: 0.6 ml/min
Detector: "RI-104" (manufactured by Shodex)
Column thermostat temperature: 40° C.
Standards: Standard polystyrenes
Sample preparation: Weigh sample in sample tube and dilute with tetrahydrofuran about 100 times.

If the Mw is above the upper limit described above, the component (A) exhibits a high viscosity. In view of coating workability, a solvent such as an organic solvent is often necessary to dilute the coating composition of the invention which contains such a component (A) to a lower viscosity. As a result, the content of the organic solvent in the coating composition is increased and the coating composition may fail to attain a reduction in volatile organic compounds (VOC).

The component (A) may be synthesized by a known synthesis method or may be purchased from the market. Examples of the commercially available products include "SILRES IC 235", "SILRES IC 232", "SILRES SY 231", "SILRES IC 368" and "SILRES IC 678" (all manufactured by Wacker Asahikasei Silicone Co., Ltd.), "KR-510", "KR-9218" and "KR-213" (manufactured by Shin-Etsu Chemical Co., Ltd.), and "Dow Corning 3074 Intermediate" (manufactured by Dow Corning Toray Co., Ltd.).

The coating composition of the present invention may include one, or two or more kinds of the components (A).

The content of the component (A) is preferably 10 to 40 mass %, and more preferably 12 to 35 mass % in 100 mass % of the solid content in the coating composition of the invention. This configuration ensures that topcoat films that are obtained will attain better weather resistance and flexibility. The solid content means the content of the components except non-reactive organic solvents.

⟨ Components (B) ⟩

The component (B) is a compound which has one or more functional groups capable of undergoing Michael addition reaction with an unsaturated double bond in an acryloyloxy group, and which has one or more alkoxy groups bonded to silicon.

Examples of the functional groups capable of undergoing Michael addition reaction with an unsaturated double bond in an acryloyloxy group include primary amino group (—NH$_2$), secondary amino groups (—NRH) and mercapto group (—SH) (wherein R is an organic group such as an alkyl group), with primary amino group and secondary amino groups being preferable.

The one or more alkoxy groups bonded to silicon are preferably C1-C10 alkoxy groups, with examples including methoxy group, ethoxy group, propoxy group and butoxy group.

For example, the component (B) is preferably a compound represented by the formula (B-1) below.

$$X-R^{B1}-SiR^{B2}{}_n(OR^{B3})_{3-n} \quad (B-1)$$

In the formula (B-1), $R^{B1}$ is a C1-C10 alkylene group, $R^{B2}$ is a C1-C10 alkyl group, a C2-C5 alkenyl group or a C6-C12 aryl group, and $R^{B3}$ is a C1-C10 alkyl group. When there are two groups $R^{B2}$, they may be the same as or different from one another. When there are two or more groups $R^{B3}$, they may be the same as or different from one another.

In the formula (B-1), X is a group represented by $R^{B4}R^{B5}N$— or HS—. $R^{B4}$ is a hydrogen atom, a C1-C10 alkyl group, a C2C5 alkenyl group, a C6-C12 aryl group, a group represented by $H_2N(CH_2)_p(NH(CH_2)_q)_r$—, or a trialkylsilyl group. Here, p and q are each independently an integer of 2 to 5, and r is an integer of 0 to 5. $R^{B5}$ is a hydrogen atom, a C1-C10 alkyl group, a C2C5 alkenyl group or a C6-C12 aryl group. In the case where $R^{B5}$ is a group other than a hydrogen atom, $R^{B4}$ is a hydrogen atom or a group represented by $H_2N(CH_2)_p(NH(CH_2)_q)_r$—.

Specific examples of the groups in the formula (B-1) will be described. Examples of the alkylene groups include methylene group, ethylene group, propylene group and butylene group. Examples of the alkyl groups include methyl group, ethyl group, propyl group, butyl group and pentyl group. Examples of the alkenyl groups include vinyl group and 2-propenyl group. Examples of the aryl groups include phenyl group, methylphenyl group and naphthyl group.

In the formula (B-1), n is an integer of 0 to 2.

Specific examples of such compounds include amino group-containing alkoxysilanes (when X is a group represented by $R^{B4}R^{B5}N$—) and/or reaction products thereof, and mercapto group-containing alkoxysilanes (when X is a group represented by HS—) and/or reaction products thereof. Examples of the reaction products include compounds derived from a primary amino group-containing alkoxysilane by the reaction of the primary amino group with other component forming a secondary amino group with one active hydrogen atom, and compounds derived from an amino group- or mercapto group-containing alkoxysilane by the hydrolysis of some alkoxy groups followed by reaction with alkoxy groups or silanol groups in components such as the silicone resin (A).

Specific examples of the amino group-containing alkoxysilanes will be described. Examples of the compounds containing a γ-aminopropyl group include $NH_2C_3H_6Si$ $(OCH_3)_3$, $NH_2C_3H_6Si(OC_2H_5)_3$, $NH_2C_3H_6Si(OC_3H_7)_3$, $NH_2C_3H_6Si(OC_4H_9)_3$, $NH_2C_3H_6Si(CH_3)(OCH_3)_2$, $NH_2C_3H_6Si(CH_3)(OC_2H_5)_2$, $NH_2C_3H_6Si(CH_3)(OC_3H_7)_2$, $NH_2C_3H_6Si(CH_3)(OC_4H_9)_2$, $NH_2C_3H_6Si(CH_3)_2(OCH_3)$, $NH_2C_3H_6Si(CH_3)_2(OC_2H_5)$, $NH_2C_3H_6Si(CH_3)_2(OC_3H_7)$, $NH_2C_3H_6Si(CH_3)_2(OC_4H_9)$, $NH_2C_3H_6Si(OCH_3)_2(OC_2H_5)_2$ and $NH_2C_3H_6Si(OC_2H_5)_2(OC_3H_7)$. Examples of the compounds containing an N-β-(aminoethyl)γ-aminopropyl group include $NH_2C_2H_4NHC_3H_6Si(OCH_3)_3$, $NH_2C_2H_4NHC_3H_6Si(OC_2H_5)_3$, $NH_2C_2H_4NHC_3H_6Si(OC_3H_7)_3$, $NH_2C_2H_4NHC_3H_6Si(OC_4H_9)_3$, $NH_2C_2H_4NHC_3H_6Si(CH_3)(OCH_3)_2$, $NH_2C_2H_4NHC_3H_6Si(CH_3)(OC_2H_5)_2$, $NH_2C_2H_4NHC_3H_6Si(CH_3)(OC_3H_7)_2$, $NH_2C_2H_4NHC_3H_6Si(CH_3)(OC_4H_9)_2$, $NH_2C_2H_4NHC_3H_6Si(CH_3)_2(OCH_3)$, $NH_2C_2H_4NHC_3H_6Si(CH_3)_2(OC_2H_5)$, $NH_2C_2H_4NHC_3H_6Si(CH_3)_2(OC_3H_7)$ and $NH_2C_2H_4NHC_3H_6Si(CH_3)_2(OC_4H_9)$. Examples of the compounds containing an N-(methyl)γ-aminopropyl group include $N(CH_3)HC_3H_6Si(OCH_3)_3$, $N(CH_3)HC_3H_6Si(CH_3)(OCH_3)_2$, $N(CH_3)HC_3H_6Si(OC_2H_5)_3$ and $N(CH_3)HC_3H_6Si(CH_3)(OC_2H_5)_2$. Examples further include $NH_2C_2H_4NHC_2H_4NHC_3H_6Si(OCH_3)_3$, $NH_2C_2H_4NHC_2H_4NHC_2H_4NHC_3H_6Si(OCH_3)_3$, $(CH_3)_3Si-NHC_3H_6Si(OCH_3)_3$ and $(CH_3)_3Si-NHC_3H_6Si(CH_3)_2(OCH_3)_2$.

Specific examples of the mercapto group-containing alkoxysilanes include mercaptomethyltrimethoxysilane, mercaptomethyldimethoxymethylsilane, mercaptomethylmethoxydimethylsilane, mercaptomethyltriethoxysilane, mercaptomethyldiethoxymethylsilane, mercaptomethylethoxydimethylsilane, mercaptopropyltrimethoxysilane, mercaptopropyldimethoxymethylsilane, mercaptopropylmethoxydimethylsilane, mercaptopropyltriethoxysilane, mercaptopropyldiethoxymethylsilane and mercaptopropylethoxydimethylsilane.

The coating composition of the present invention may include one, or two or more kinds of the components (B).

The content of the component (B) is preferably 5 to 25 mass %, and more preferably 10 to 20 mass % in 100 mass % of the solid content in the coating composition of the invention. This configuration ensures that the weather resistance and interval adhesion of coating films will be enhanced.

⟨Components (C)⟩

The component (C) is a trifunctional or polyfunctional aliphatic urethane acrylate oligomer having a cyclic structure. The "trifunctional or polyfunctional" means that the oligomer has acryloyloxy groups as the functional groups. That is, the component (C) has 3 or more acryloyloxy groups, and preferably has 3 to 6, and more preferably 3 acryloyloxy groups. This configuration ensures that the hardness and weather resistance of coating films will be enhanced. When the oligomer contains 3 acryloyloxy groups, the flexibility of coating films can be further enhanced. In the case of a bifunctional aliphatic urethane acrylate oligomer, coating films have a low crosslinking density and tend to be deteriorated in film hardness, and also tend to have low water resistance and low adhesion with respect to undercoat films.

For example, the cyclic structure may be a saturated alicyclic structure, an unsaturated alicyclic structure or a heterocyclic structure, with the proviso that the cyclic structure is not an aromatic ring. Examples of the saturated alicyclic structures include cyclohexane rings and tricyclodecane rings. Examples of the unsaturated alicyclic structures include cyclohexene rings and cyclopentene rings. Examples of the heterocyclic structures include isocyanuric rings. The component (C) may contain one, or two or more cyclic structures. When two or more rings are present, the rings may be independent from one another or may be continuous. In the case of an aromatic urethane acrylate oligomer, weather resistance tends to be poor due to the aromatic ring.

The component (B) is capable of undergoing Michael addition reaction with the acryloyloxy groups present in the component (C). The component (C) has a higher molecular weight than the component (D) described later, and is polymerized by the reaction with the component (B) to allow coating films to attain higher toughness, to be more flexible and weather resistant, and to maintain high levels of performance as topcoat films over a long term in an environment to which the coating films are exposed.

For example, the component (C) is an oligomer that is obtained by reacting at least an isocyanate compound (c1) having a cyclic structure, and an acrylate monomer (c2) having a hydroxyl group, and has the cyclic structure derived from the component (c1) and the acryloyloxy groups derived from the component (c2).

The isocyanate compound (c1) is not particularly limited as long as the compound has a cyclic structure and has two or more isocyanate groups in the molecule. Examples thereof include alicyclic polyisocyanate compounds such as isophorone diisocyanate, norbornane diisocyanate, hydrogenated diphenylmethane diisocyanate, hydrogenated xylylene diisocyanate, 1,3-bis(isocyanatomethyl)-cyclohexane and dicyclohexylmethane-4,4'-diisocyanate; biurets, isocyanurates and allophanates of these compounds; compounds obtained by modifying part of the isocyanate groups in the above compounds with modifiers, for example, alcohols such as trimethylolpropane, tricyclodecanedimethanol and 1,4-cyclohexanedimethanol, amides such as δ-lactam, imides such as phthalimide, carbodiimides and epoxides (for example, compounds with two or more isocyanate groups in the molecule which are obtained by the urethane-forming reaction of polyhydric alcohols and alicyclic polyisocyanate compounds); and isocyanurates of alkane diisocyanates such as hexamethylene diisocyanate and pentamethylene diisocyanate.

The compounds described above may be used singly, or two or more may be used as a mixture.

Of the above compounds, isocyanurates of alicyclic polyisocyanate compounds are preferable from the point of view of the weather resistance and flexibility of coating films, and isocyanurates of isophorone diisocyanate are particularly preferable.

The acrylate monomer (c2) has a hydroxyl group and an acryloyloxy group. The hydroxyl group of the component (c2) reacts with isocyanate groups of the component (c1) to form an aliphatic urethane acrylate oligomer (C) which has an acryloyloxy group in its chemical structure. Examples of the components (c2) include hydroxyalkyl group-containing acrylates such as 2-hydroxyethyl acrylate, 2-hydroxypropyl acrylate, 4-hydroxybutyl acrylate and 1,4-cyclohexanedimethanol monoacrylate; caprolactone-modified hydroxyalkyl acrylates such as compounds represented by the formula (C-1) below; and hydroxyl group-containing polyfunctional acrylates such as pentaerythritol triacrylate and dipentaerythritol pentaacrylate.

The compounds described above may be used singly, or two or more may be used as a mixture.

When the isocyanate compound (c1) that is used is a compound having two isocyanate groups in the molecule, at least one of hydroxyl group-containing polyfunctional acrylates is used as the acrylate monomer (c2). Here, an acrylate monomer (c2) other than the hydroxyl group-containing polyfunctional acrylates may be further used.

[Chem. 3]

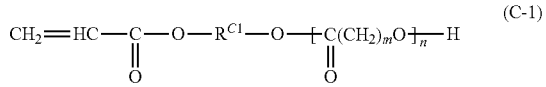

(C-1)

In the formula (C-1), $R^{C1}$ is a C2-C6 alkylene group, m is an integer of 3 to 8, and n is an integer of 1 to 5. From the point of view of the balance of properties such as weather resistance and flexibility of cured coating films, caprolactone-modified hydroxyethyl acrylates having an ethylene group as $R^{C1}$ are preferable.

Some exemplary commercial products of caprolactone-modified hydroxyalkyl acrylates are "PLACCEL FA1", "PLACCEL FA2", "PLACCEL FA2D", "PLACCEL FA3", "PLACCEL FA4" and "PLACCEL FA5" (product names, all manufactured by Daicel Corporation).

The molecular weight of the component (C) is not particularly limited, but the weight average molecular weight (Mw) thereof is preferably 700 to 6,000, and more preferably 1,000 to 4,500. If the weight average molecular weight is less than 700, the amount of cure shrinkage in which a coating film is shrunk at the time of curing may be so large that flexibility is sometimes lowered. If, on the other hand, the weight average molecular weight is more than 6,000, the coating composition may be so viscous and difficult to apply, and the crosslinking density is lowered to cause deteriorations in the hardness and weather resistance of cured coating films in some cases. Details of the conditions for the measurement of the Mw of the component (C) will be described in EXAMPLES.

The coating composition of the present invention may include one, or two or more kinds of the components (C).

The content of the component (C) is preferably 5 to 40 mass %, and more preferably 10 to 30 mass % in 100 mass % of the solid content in the coating composition of the invention. This configuration ensures that cured coating films will attain further enhancements in weather resistance and flexibility.

⟨Bifunctional Acrylate Monomers (D)⟩

The bifunctional acrylate monomer (D) has no ether structures (except an ether structure in an acryloyloxy group ($CH_2$=CH—C(=O)O—)) and no aromatic rings.

The component (B) is capable of undergoing Michael addition reaction with the acryloyloxy groups present in the component (D). The component (D) has a lower molecular weight than the component (C) and reacts with the component (B) to increase the density of coating films and to enhance properties of coating films.

The molecular weight of the component (D) is usually less than 700, and preferably less than 500.

The component (D) is a bifunctional monomer having two acryloyloxy groups. The use of such a bifunctional acrylate monomer enhances the flexibility and interval adhesion of topcoat films as compared to when a trifunctional or polyfunctional acrylate monomer is used.

The component (D) has no ether structures with the above proviso and no aromatic rings. This configuration makes it possible to enhance the weather resistance of topcoat films. Further, the component (D) serves as a reactive diluent.

Examples of the components (D) include alkanediol diacrylates such as 1,4-butanediol diacrylate, 1,6-hexanediol diacrylate, 1,9-nonanediol diacrylate and 1,10-decanediol diacrylate; and alicyclic skeleton-containing diacrylates such as tricyclodecanedimethanol diacrylate.

The number of carbon atoms in the alkanediols in the alkanediol diacrylates is usually 4 to 10, and preferably 6 to 9.

Of the components (D), linear acrylate monomers are preferable, and linear alkanediol diacrylates such as 1,6-hexanediol diacrylate are more preferable. This configuration ensures that the weather resistance and flexibility of cured coating films will be further enhanced.

The coating composition of the present invention may include one, or two or more kinds of the components (D).

The content of the component (D) is preferably 1 to 30 mass %, and more preferably 5 to 25 mass % in 100 mass % of the solid content in the coating composition of the invention. This configuration ensures that the weather resistance and flexibility of cured coating films will be further enhanced.

⟨(A+B: Acrylate Oligomers+Acrylate Monomers⟩

In the coating composition of the present invention, the mass ratio of the total amount of the component (A) and the component (B) to the total amount of any acrylate oligomer(s) and any acrylate monomer(s) (A+B:acrylate oligomer(s)+acrylate monomer(s)) is 40:60 to 70:30, and preferably 50:50 to 65:35. This configuration ensures that cured coating films will be well balanced in weather resistance, flexibility and interval adhesion.

If the A+B mass ratio is more than 70, coating films tend to be brittle and tend to exhibit lowered adhesion with respect to undercoat films. If the acrylate oligomer(s)+acrylate monomer(s) mass ratio is more than 60, coating films tend to have low gloss and tend to exhibit lowered adhesion with respect to undercoat films.

The acrylate oligomer(s) is an oligomer having an acryloyloxy group. In the case of the coating composition of the present invention, this oligomer(s) includes the component (C). The acrylate monomer(s) is a monomer having an acryloyloxy group. In the case of the coating composition of the present invention, this monomer(s) includes the component (D). In the present invention, the component (C) preferably represents not less than 50 mass %, and more preferably not less than 80 mass % of the acrylate oligomers, and still more preferably represents 100 mass % of the acrylate oligomer. The component (D) preferably represents not less than 50 mass %, and more preferably not less than 80 mass % of the acrylate monomers, and still more preferably represents 100 mass % of the acrylate monomer.

The weight average molecular weight (Mw; measured by the same method as the component (C)) of the acrylate oligomers is preferably not less than 700, and more preferably in the same range as the component (C). The molecular weight of the acrylate monomers is preferably less than 700.

⟨Acrylate Oligomer(s): Acrylate Monomer(s)⟩

In the coating composition of the present invention, the mass ratio of any acrylate oligomer(s) to any acrylate monomer(s) (acrylate oligomer(s):acrylate monomer(s)) is preferably 60:40 to 75:25. This configuration ensures that cured coating films will be well balanced in weather resistance, flexibility and interval adhesion.

⟨Additives⟩

The coating composition of the present invention may contain additives as required while still achieving the advantageous effects of the invention. Examples of such additives include pigments, pigment dispersants, anti-sagging anti-settling agents, anti-foaming agents and dehydrating agents. The coating composition of the present invention may contain one, or two or more kinds of additives, and may contain one, or two or more additives belonging to the same kind.

Examples of the pigments include known coloring pigments and extender pigments. Examples of the coloring pigments include inorganic pigments such as carbon black, titanium oxide, red iron oxide, iron oxide, iron hydroxide and ultramarine blue; and organic pigments such as phthalocyanine blue and phthalocyanine green. Examples of the extender pigments include calcium carbonate, potassium feldspar, kaolin, clay, talc, bentonite, magnesium carbonate and silica fine powder.

The content of the pigment is preferably 15 to 45 mass %, and more preferably 20 to 40 mass % in 100 mass % of the solid content in the coating composition of the invention.

Additives other than the pigments may be preferably contained each independently in the range of 0.1 to 5.0 mass % in 100 mass % of the solid content in the coating composition of the invention.

⟨Curing Catalysts⟩

The coating composition of the present invention preferably includes a curing catalyst. In this case, the coating composition of the invention may be cured more favorably in, for example, a humidity environment around room temperature.

Examples of the curing catalysts include tin carboxylates such as tin naphthenate and tin oleate; tin compounds such as dibutyltin diacetate, dibutyltin acetoacetonate, dibutyltin dioctoate, dibutyltin dilaurate, dibutyltin dioleate, dibutyltin oxide, dibutyltin dimethoxide, dibutyltin dipentoate, dibutyltin dioctoate, dibutyltin dineodecanoate, dioctyltin dineodecanoate, bis(dibutyltin laurate) oxide, dibutylbis(triethoxysiloxy)tin, bis(dibutyltin acetate) oxide, dibutyltin bis(ethyl maleate) and dioctyltin bis(ethyl maleate); organometal compounds including titanate esters and titanium chelate compounds such as tetraisopropoxytitanium, tetra-n-butoxytitanium, tetrakis(2-ethylhexoxy)titanium, dipropoxybis(acetylacetonato)titanium and titanium isopropoxyoctyl glycol, and further including zinc naphthenate, zinc stearate, zinc-2-ethyloctoate, zinc-2-ethylhexoate, zinc acetylacetonate, iron-2-ethylhexoate, cobalt-2-ethylhexoate, manganese-2-ethylhexoate, bismuth-2-ethylhexoate, bismuth neodecanoate, bismuth octoate-caprate, bismuth tetramethylheptanedioate, lithium neodecanoate, strontium-2-ethylhexoate, cobalt naphthenate and alkoxyaluminum compounds; amine compounds and salts thereof such as hexylamine, dodecyldodecylamine phosphate, dimethylhydroxylamine and diethylhydroxylamine; quaternary ammonium salts such as benzyltriethylammonium acetate; and alkali metal salts of lower fatty acid such as potassium acetate, sodium acetate and lithium oxalate.

The addition of the curing catalyst promotes the formation of coating films, and allows dry coating films to be obtained more quickly.

Of the above curing catalysts, organometal compounds containing bismuth, zinc, lithium, etc. allow coating films to be obtained with the same drying performance as when tin compounds are used.

The content of the curing catalyst is usually not more than 15 parts by mass with respect to 100 parts by mass of the silicone resin (A). The lower limit of the amount in which the curing catalyst is used is, for example, 0.001 part by mass or 0.01 part by mass.

⟨Non-Reactive Organic Solvents⟩

The coating composition of the present invention may include a non-reactive organic solvent.

The non-reactive organic solvents are not reactive diluent solvents which are reactive with the components contained in the coating composition, but are organic solvents which have no reactivity with respect to the components. Examples of such organic solvents include known organic solvents such as aromatic solvents, aliphatic solvents, ketone solvents, ether solvents, ester solvents and alcohol solvents. Specific examples include aromatic hydrocarbon solvents such as toluene and xylene; aliphatic hydrocarbon solvents such as mineral spirit and cyclohexane; ketone solvents such as methyl isobutyl ketone and cyclohexanone; ether or ester solvents such as propylene glycol monomethyl ether and propylene glycol monomethyl ether acetate; and alcohol solvents such as n-butyl alcohol and isopropyl alcohol.

In the present invention, the amount of the non-reactive organic solvent used may be reduced by using the aforementioned components having an appropriate molecular weight. For example, in an embodiment, the content of the non-reactive organic solvent is preferably not more than 10 mass %, and more preferably not more than 5 mass % in 100 mass % of the coating composition of the present invention. This configuration is preferable from the point of view of VOC reduction.

⟨Embodiments of Coating Compositions⟩

The coating composition of the present invention may be provided as a two-part or multi-part paint such as, for example, one composed of a base resin component and a curing agent component. These agents are separately stored in respective containers such as cans, and are mixed together by stirring when they are used to form a coating film. In the case where the coating composition is a two-part system, the base resin component and the curing agent component are separately packaged (packed) and are mixed together at the time of use.

The base resin component usually includes the component (A), the component (C) and the component (D). Where necessary, the base resin component may contain at least one additive selected from those described hereinabove, and may contain a non-reactive organic solvent.

The curing agent component usually includes the component (B) and preferably further includes a curing catalyst. Where necessary, the curing agent component may contain at least one additive selected from those described hereinabove, and may contain a non-reactive organic solvent.

The contents of the components in the base resin component and the curing agent component are not particularly limited as long as the contents of the components in the mixture of the base resin component and the curing agent component fall in the aforementioned ranges.

The coating composition of the present invention may be used to protect, for example, the surface, in particular air-exposed portions, of the substrates of (large-scale) iron or steel structures such as ships, bridges, tanks, plants, marine buoys and pipelines.

For example, the coating composition of the present invention is particularly suited to form a topcoat film on an undercoated substrate including a substrate and an undercoat film disposed on the substrate, namely, to form a topcoat film on such an undercoat film.

The coating composition of the present invention can form a coating film that is excellent in weather resistance in terms of appearance, gloss and the like, and is excellent in hardness, flexibility such as flex resistance, and adhesion with respect to an undercoat film. Specifically, the coating composition of the present invention can form a topcoat film which can maintain an acceptable appearance and gloss as the topcoat film over a long term even when exposed to environments where solar radiation is plenty and UV light is intense, and which exhibits outstanding adhesion, in particular interval adhesion, with respect to an undercoat film.

[Coating films]

A coating film of the present invention is formed from the coating composition of the invention described hereinabove.

The coating film of the invention may be formed on a substrate which the coating composition described hereinabove is designed to paint on. The present invention also pertains to a substrate with a coating film, the substrate including a substrate and the coating film of the invention. In the substrate with a coating film, the coating film of the invention may be formed on the surface of a substrate, or may be formed on the surface of an undercoated substrate including a substrate and an undercoat film disposed on the substrate, namely, on the surface of such an undercoat film. In the latter case, the coating composition of the invention forms a topcoat film on the undercoat film.

Some exemplary materials of the substrates are metals, concretes, resin materials, fiber-reinforced resin materials, wood materials and papers. Specific examples of the metals include steels such as carbon steel, stainless steel and galvanized steel, aluminum, copper, copper alloys and zinc. The shapes of the substrates are not particularly limited and may be, for example, plates, pipes, half pipes or spheres. Specific examples of the substrates to which the coating composition of the invention is applied include (large-scale) iron or steel structures such as ships, bridges, tanks, plants, marine buoys and pipelines.

The surface of the metal substrates may be coated with a shop primer or the like. Where necessary, the substrates may be subjected to surface treatments (such as blasting, and removal of oil and dust by degreasing) to remove undesired substances such as rust, oil, fat, water, dust and salt on the substrates or to enhance the adhesion of the coating film.

The coating film of the present invention may be formed by, for example, applying the coating composition of the invention onto the substrate, and drying the coating composition applied. The drying time is usually about 1 to 30 days, and preferably about 1 to 7 days. The temperature during the film formation is usually 5 to 40° C., and preferably 10 to 30° C., and may be, for example, room temperature. The humidity during the film formation is usually 20 to 90%, and preferably 40 to 85%. The drying may be performed in the air. In the present invention, the coating composition may be favorably cured in, for example, a humidity environment around room temperature.

The film thickness after drying of the coating film of the present invention is usually 20 to 200 μm, and preferably 50 to 150 μm. The coating film with such a film thickness may be formed in one application or in two or more times of application (two or more painting operations).

In the coating film of the present invention, the minimum diameter of a mandrel determined with respect to the coating film with a dry film thickness of 100 μm in accordance with JIS K5600-5-1:1999 is preferably not more than 10 mm, and more preferably not more than 4 mm. Such a coating film exhibits excellent flex resistance.

The undercoat film described above may be, for example, a coating film formed from an epoxy resin anticorrosive coating composition. The epoxy resin anticorrosive coating composition may be a known anticorrosive coating composition. Examples thereof include anticorrosive coating compositions including an epoxy resin and an epoxy resin-curing agent.

Examples of the epoxy resins include bisphenol epoxy resins, glycidyl ester epoxy resins, glycidyl amine epoxy resins, phenol novolak epoxy resins, cresol epoxy resins, dimer acid-modified epoxy resins, aliphatic epoxy resins, alicyclic epoxy resins and epoxidized oil-based epoxy resins.

Examples of the epoxy resin-curing agents include amine-based agents for curing epoxy resins, specifically, Mannich modified amines formed by the Mannich condensation reaction of phenol compounds, formalin and amine compounds; aliphatic polyamines; polyether amines; and polyamidoamines produced by the condensation of dimer acids and polyamines and having first and second reactive amino groups in the molecule.

In an embodiment, the amine-based epoxy resin-curing agent may be used in such an (equivalent) amount that the number of epoxy groups in the epoxy resin is equal to the number of amino groups in the amine-based curing agent, or may be used in such an amount that the equivalent of amino groups is 0.35 to 0.90 per equivalent of epoxy groups. Alternatively, the amine-based curing agent may be usually used in the range of 10 to 80 parts by mass, and preferably 20 to 70 parts by mass with respect to 100 parts by mass of the epoxy resin.

The undercoat film is formed by, for example, applying the epoxy resin anticorrosive coating composition onto the substrate surface, and drying the coating composition for about 1 to 7 days. The temperature during the film formation is usually 5 to 40° C., and preferably 10 to 30° C., and may be, for example, room temperature. The humidity during the film formation is usually 20 to 90%, and preferably 40 to 85%. The drying may be performed in the air.

The film thickness after drying of the undercoat film is usually 50 to 500 μm, and preferably 150 to 350 μm. The coating film with such a film thickness may be formed in one application or in two or more times of application (two or more painting operations).

The coating composition of the present invention and the epoxy resin anticorrosive coating composition may be applied by methods such as, for example, brushing, air spray painting, airless spray painting and roll coater painting. Spray painting is preferable for reasons such as that this technique is excellent in workability, productivity, etc. and can easily paint substrates having a large area to allow the advantageous effects of the invention to be produced more efficiently.

A composite coating film having an epoxy resin anticorrosive coating film and the coating film of the present invention may be obtained by, for example, forming an epoxy resin anticorrosive coating film on the substrate surface and thereafter forming a coating film of the coating composition of the invention onto the anticorrosive coating film. The conditions for forming each of these coating films are as described hereinabove.

In the present invention, it is possible to obtain a topcoat film which advantageously attains high adhesion with respect to an epoxy resin anticorrosive coating film as an undercoat film even in the case where the undercoat film is overcoated with the coating film of the invention after a long period (coating interval), for example, about 1 to 100 days.

EXAMPLES

The present invention will be described in greater detail based on Examples hereinbelow without limiting the scope of the invention to such Examples. In the following, "parts" means "parts by mass" unless otherwise mentioned.

Production Example 1

Composition Containing Urethane Acrylate Oligomer (C1)

A reaction vessel equipped with a condenser, an oxygen inlet tube, a thermometer, a dropping device, an oil bath and a stirrer was loaded with 28.2 parts of isocyanurate of isophorone diisocyanate (IPDI) ("VESTANAT T1890/100" manufactured by Evonik Japan Co., Ltd.), 30 parts of 1,6-hexanediol diacrylate (HDDA) and 0.1 part of 4-methoxyphenol ("MEHQ" manufactured by Kishida Chemical Co., Ltd.). While maintaining the temperature conditions at 80±5° C. under a stream of air, a mixture including 41.85 parts of caprolactone-modified hydroxyethyl acrylate ("PLACCEL FA2D" manufactured by Daicel Corporation) and 0.07 parts of dibutyltin dilaurate ("GLECK TL" manufactured by DIC Corporation) was added dropwise through the dropping device over a period of 1 hour. The resultant mixture was reacted uniformly at the temperature for 6 hours to give a composition containing a urethane acrylate oligomer (C1) (HDDA content: 30 mass %). The composition was a transparent solution with a viscosity of 3,622 mPa·s/25° C., and the weight average molecular weight (Mw) of the urethane acrylate oligomer (C1) measured by GPC was 3,920.

The viscosity was measured at 25° C. using an E-type viscometer.

The conditions for the measurement of the weight average molecular weight (Mw) of the component (C) were as follows.

Apparatus: "HLC-8220" (manufactured by TOSOH CORPORATION)
Columns: One "TSKgel Super H4000" column and two "TSKgel Super H2000" columns were connected together (all columns manufactured by TOSOH CORPORATION, 6 mm in inner diameter×15 cm in length)
Eluent: Tetrahydrofuran 99% (stabilized with BHT)
Flow rate: 0.5 ml/min
Detector: Differential refractometer (RI) incorporated in HLC-8220 apparatus
Column thermostat temperature: 40° C.
Standards: Standard polystyrenes
Sample preparation: Sample was weighed in sample tube and diluted with tetrahydrofuran about 100 times.

Production Examples 2 to 4

Compositions containing urethane acrylate oligomers (C2) to (C4) were obtained in the same manner as in Production Example 1, except that the components described in Table 1 were used.

TABLE 1

|  | Prod. Ex. 1 | Prod. Ex. 2 | Prod. Ex. 3 | Prod. Ex. 4 |
| --- | --- | --- | --- | --- |
| Urethane acrylate oligomer | C1 | C2 | C3 | C4 |
| IPDI isocyanurate | 28.2 | 28.2 | 28.2 | 28.2 |
| 1,6-Hexanediol diacrylate (HDDA) | 30 | | | |
| Tricyclodecanedimethanol diacrylate ("IRR214-K" manufactured by DAICEL-ALLNEX LTD.) | | 30 | | |
| Tripropylene glycol diacrylate (TPGDA) | | | 30 | |
| Trimethylolpropane triacrylate (TMPTA) | | | | 30 |
| 4-Methoxyphenol | 0.1 | 0.1 | 0.1 | 0.1 |
| Caprolactone-modified hydroxyethyl acrylate | 41.85 | 41.85 | 41.85 | 41.85 |
| Dibutyltin dilaurate | 0.07 | 0.07 | 0.07 | 0.07 |
| Viscosity (mPa · s/25° C.) of composition containing urethane acrylate oligomer (C) | 3,622 | 41,000 | 4,930 | 35,930 |
| Weight average molecular weight (Mw) of urethane acrylate oligomer (C) | 3,920 | 4,450 | 4,140 | 4,880 |
| Proportion (mass %) of content of acrylate monomer | 30 | 30 | 30 | 30 |

Table 2 below lists the raw materials used in Examples and other experiments.

TABLE 2

| Product names | Manufacturers | Remarks |
| --- | --- | --- |
| KR-510 | Shin-Etsu Chemical Co., Ltd. | Methyl phenyl silicone resin (methoxy group content = 17 wt %) (Mw = 1700) |
| KR-213 | Shin-Etsu Chemical Co., Ltd. | Methyl phenyl silicone resin (methoxy group content = 20 wt %) (Mw = 500) |
| KR-9218 | Shin-Etsu Chemical Co., Ltd. | Methyl phenyl silicone resin (methoxy group content = 15 wt %) (Mw = 700) |
| KRM9187 | DAICEL-ALLNEX LTD. | Aliphatic urethane acrylate oligomer (tetrafunctional) (Mw = 1600) (IPDI) HDDA 20% |
| EBECRYL 9270 | DAICEL-ALLNEX LTD. | Aliphatic urethane acrylate oligomer (bifunctional) (Mw = 1000) (IPDI) |
| EBECRYL 204 | DAICEL-ALLNEX LTD. | Aromatic urethane acrylate oligomer (trifunctional) (Mw = 2000) HDDA 25% |
| EBECRYL 810 | DAICEL-ALLNEX LTD. | Polyester acrylate oligomer (tetrafunctional) (Mw = 1000) |

TABLE 2-continued

| Product names | Manufacturers | Remarks |
|---|---|---|
| IRR214-K | DAICEL-ALLNEX LTD. | Tricyclodecanedimethanol diacrylate (molecular weight 304) |
| TIPAQUE PFC105 | ISHIHARA SANGYO KAISHA, LTD. | Coloring pigment (titanium oxide) |
| BYK-111 | BYK Japan KK | Dispersant |
| BYK-1790 | BYK Japan KK | Anti-foaming agent |
| BYK-410 | BYK Japan KK | Anti-sagging agent (modified urea; solid content 50%) |
| DISPARLON A630-20X | Kusumoto Chemicals, Ltd. | Anti-sagging agent (amide wax (solid content 20%)) |
| KBE-903 | Shin-Etsu Chemical Co., Ltd. | 3-Aminopropyltriethoxysilane |
| KBM-903 | Shin-Etsu Chemical Co., Ltd. | 3-Aminopropyltrimethoxysilane |
| NEOSTANN U-200 | Nitto Kasei Co., Ltd. | Dibutyltin diacetate |
| Borchers Deca Lithium 2 | Borchers sas | Lithium neodecanoate |
| Borchi Kat 22 | Borchers sas | Zinc-2-ethylhexoate |
| Borchi Kat 24 | Borchers sas | Bismuth-2-ethylhexoate |

Example 1

Acrylic Polysiloxane Resin Coating Composition 12.5 Parts of silicone resin "KR-510" was added to a container. Next, 1.0 part of dispersant "BYK-111" was added and further 29.0 parts of pigment "TIPAQUE PFC105" was added. Thereafter, glass beads GB605M (manufactured by Potters-Ballotini Co., Ltd.) were added. These components were mixed together with a paint shaker (manufactured by ASADA IRON WORKS. CO., LTD.).

Next, the glass beads were removed, followed by the addition of 37.1 parts of the urethane acrylate oligomer (C1)-containing composition (HDDA content: 30 mass %) from Production Example 1, 0.9 parts of 1,6-hexanediol diacrylate and additives including 2.5 parts of "DISPARLON A630-20X", 0.7 parts of "BYK-1790" and 2.0 parts of "BYK-410". The components were mixed together with disperser "HOMODISPER MODEL 2.5" (manufactured by PRIMIX Corporation). Thus, a base resin component of an acrylic polysiloxane resin coating composition was prepared.

13.0 Parts of aminosilane "KBE-903" and 1.3 parts of catalyst "NEOSTANN U-200" were added to another container. These components were mixed together with disperser "HOMODISPER MODEL 2.5" (manufactured by PRIMIX Corporation). Thus, a curing agent component of an acrylic polysiloxane resin coating composition was prepared.

Immediately before the coating process, the base resin component and the curing agent component prepared above were mixed together with disperser "HOMODISPER MODEL 2.5" (manufactured by PRIMIX Corporation) to give an acrylic polysiloxane resin coating composition.

Examples 2 to 11 and Comparative Examples 1 to 7

Acrylic polysiloxane resin coating compositions were prepared in the same manner as in Example 1, except that the types and amounts of the components were changed as described in Table 3 and Table 4.

TABLE 3

| | | | Ex. 1 | Ex. 2 | Ex. 3 | Ex. 4 |
|---|---|---|---|---|---|---|
| Base resin | (A) : Silicone resins | KR-510 | 12.5 | 21.5 | 31.0 | 21.5 |
| | | KR-213 | | | | |
| | | KR-9218 | | | | |
| | (C): Urethane acrylate oligomers | (C1)-Containing composition (HDDA 30%) | 37.1 | 25.0 | 19.0 | |
| | Other urethane acrylate oligomers | (C2)-Containing composition (IRR214-K 30%) | | | | |
| | Acrylate monomers (D) and | (C3)-Containing composition (TPGDA 30%) | | | | |
| | Other acrylate monomers | (C4)-Containing composition (TMPTA 30%) | | | | |
| | | KRM9187 (HDDA 20%) | | | | 21.9 |
| | | EBECRYL 9270 | | | | |
| | | EBECRYL 204 (HDDA 25%) | | | | |
| | Polyester acrylate oligomer | EBECRYL 810 | | | | |
| | (D): Acrylate monomers and | HDDA (1,6-hexanediol diacrylate) | 0.9 | 3.5 | | 6.6 |
| | Other acrylate monomers | IRR214-K (tricyclodecanedimethanol diacrylate) | | | | |
| | | TPGDA (tripropylene glycol diacrylate) | | | | |
| | | TMPTA (trimethylolpropane triacrylate) | | | | |
| | Coloring pigment | TIPAQUE PFC105 | 29.0 | 29.0 | 29.0 | 29.0 |
| | Dispersant | BYK-111 | 1.0 | 1.0 | 1.0 | 1.0 |
| | Anti-sagging agent | BYK-410 | 2.0 | 2.0 | 2.0 | 2.0 |
| | Anti-sagging agent | A630-20X | 2.5 | 2.5 | 2.5 | 2.5 |
| | Anti-foaming agent | BYK-1790 | 0.7 | 0.7 | 0.7 | 0.7 |

TABLE 3-continued

| | | | | | | |
|---|---|---|---|---|---|---|
| Curing agent | Tin catalyst | NEOSTANN U-200 | 1.3 | 1.3 | 1.3 | 1.3 |
| | Lithium catalyst | Borchers Deca Lithium 2 | | | | |
| | Zinc catalyst | Borchi Kat 22 | | | | |
| | Bismuth catalyst | Borchi Kat 24 | | | | |
| | (B): Aminosilanes | KBE-903 (3-aminopropyltriethoxysilane) | 13.0 | 13.5 | 13.5 | 13.5 |
| | | KBM-903 (3-aminopropyltrimethoxysilane) | | | | |
| | Total amount | | 100 | 100 | 100 | 100 |
| | A + B | Proportions (mass %) relative to total of A, B, | 40% | 55% | 70% | 55% |
| | Acrylate oligomers + acrylate monomers | acrylate oligomers and acrylate monomers | 60% | 45% | 30% | 45% |
| | Acrylate oligomers:acrylate monomers | Mass ratio | 68:32 | 61:39 | 70:30 | 61:39 |
| | Weather resistance evaluation 1 (gloss retention) | | 70% | 77% | 79% | 75% |
| | Weather resistance evaluation 2 (coating film appearance) | | ND | ND | ND | ND |
| | Flex resistance (mandrel minimum diameter) | | 3 mm | 3 mm | 4 mm | 8 mm |
| | Interval adhesion (residual area percentage (%)) | | 85% | 90% | 90% | 85% |
| | Film hardness (pencil hardness) | | 2H | 2H | 2H | 2H |

| | | | Ex. 5 | Ex. 6 | Ex. 7 | Ex. 8 |
|---|---|---|---|---|---|---|
| Base resin | (A): Silicone resins | KR-510 | 21.5 | 21.5 | 21.5 | 21.5 |
| | | KR-213 | | | | |
| | | KR-9218 | | | | |
| | (C): Urethane acrylate oligomers | (C1)-Containing composition (HDDA 30%) | | 25.0 | 25.0 | 25.0 |
| | Other urethane acrylate oligomers | (C2)-Containing composition (IRR214-K 30%) | 25.0 | | | |
| | Acrylate monomers (D) and | (C3)-Containing composition (TPGDA 30%) | | | | |
| | Other acrylate monomers | (C4)-Containing composition (TMPTA 30%) | | | | |
| | | KRM9187 (HDDA 20%) | | | | |
| | | EBECRYL 9270 | | | | |
| | | EBECRYL 204 (HDDA 25%) | | | | |
| | Polyester acrylate oligomer | EBECRYL 810 | | | | |
| | (D): Acrylate monomers and | HDDA (1,6-hexanediol diacrylate) | | 3.5 | 3.5 | 3.5 |
| | Other acrylate monomers | IRR214-K (tricyclodecanedimethanol diacrylate) | 3.5 | | | |
| | | TPGDA (tripropylene glycol diacrylate) | | | | |
| | | TMPTA (trimethylolpropane triacrylate) | | | | |
| | Coloring pigment | TIPAQUE PFC105 | 29.0 | 29.0 | 29.0 | 29.0 |
| | Dispersant | BYK-111 | 1.0 | 1.0 | 1.0 | 1.0 |
| | Anti-sagging agent | BYK-410 | 2.0 | 2.0 | 2.0 | 2.0 |
| | Anti-sagging agent | A630-20X | 2.5 | 2.5 | 2.5 | 2.5 |
| | Anti-foaming agent | BYK-1790 | 0.7 | 0.7 | 0.7 | 0.7 |
| Curing agent | Tin catalyst | NEOSTANN U-200 | 1.3 | | | |
| | Lithium catalyst | Borchers Deca Lithium 2 | | 1.3 | | |
| | Zinc catalyst | Borchi Kat 22 | | | 1.3 | |
| | Bismuth catalyst | Borchi Kat 24 | | | | 1.3 |
| | (B): Aminosilanes | KBE-903 (3-aminopropyltriethoxysilane) | 13.5 | 13.5 | 13.5 | 13.5 |
| | | KBM-903 (3-aminopropyltrimethoxysilane) | | | | |
| | Total amount | | 100 | 100 | 100 | 100 |
| | A + B | Proportions (mass %) relative to total of A, B, | 55% | 55% | 55% | 55% |
| | Acrylate oligomers + acrylate monomers | acrylate oligomers and acrylate monomers | 45% | 45% | 45% | 45% |
| | Acrylate oligomers:acrylate monomers | Mass ratio | 61:39 | 61:39 | 61:39 | 61:39 |
| | Weather resistance evaluation 1 (gloss retention) | | 75% | 77% | 75% | 73% |
| | Weather resistance evaluation 2 (coating film appearance) | | ND | ND | ND | ND |
| | Flex resistance (mandrel minimum diameter) | | 8 mm | 3 mm | 3 mm | 3 mm |
| | Interval adhesion (residual area percentage (%)) | | 85% | 90% | 90% | 90% |
| | Film hardness (pencil hardness) | | 2H | 2H | 2H | 2H |

| | | | Ex. 9 | Ex. 10 | Ex. 11 |
|---|---|---|---|---|---|
| Base resin | (A): Silicone resins | KR-510 | | | 21.5 |
| | | KR-213 | 21.5 | | |
| | | KR-9218 | | 21.5 | |
| | (C): Urethane acrylate oligomers | (C1)-Containing composition (HDDA 30%) | 25.0 | 25.0 | 25.0 |
| | Other urethane acrylate oligomers | (C2)-Containing composition (IRR214-K 30%) | | | |
| | Acrylate monomers (D) and | (C3)-Containing composition (TPGDA 30%) | | | |
| | Other acrylate monomers | (C4)-Containing composition (TMPTA 30%) | | | |
| | | KRM9187 (HDDA 20%) | | | |
| | | EBECRYL 9270 | | | |
| | | EBECRYL 204 (HDDA 25%) | | | |
| | Polyester acrylate oligomer | EBECRYL 810 | | | |
| | (D): Acrylate monomers and | HDDA (1,6-hexanediol diacrylate) | 3.5 | 3.5 | 3.5 |
| | Other acrylate monomers | IRR214-K (tricyclodecanedimethanol diacrylate) | | | |
| | | TPGDA (tripropylene glycol diacrylate) | | | |
| | | TMPTA (trimethylolpropane triacrylate) | | | |
| | Coloring pigment | TIPAQUE PFC105 | 29.0 | 29.0 | 29.0 |
| | Dispersant | BYK-111 | 1.0 | 1.0 | 1.0 |
| | Anti-sagging agent | BYK-410 | 2.0 | 2.0 | 2.0 |
| | Anti-sagging agent | A630-20X | 2.5 | 2.5 | 2.5 |
| | Anti-foaming agent | BYK-1790 | 0.7 | 0.7 | 0.7 |
| Curing agent | Tin catalyst | NEOSTANN U-200 | 1.3 | 1.3 | 1.3 |
| | Lithium catalyst | Borchers Deca Lithium 2 | | | |

TABLE 3-continued

|  |  |  |  |  |
|---|---|---|---|---|
| Zinc catalyst | Borchi Kat 22 |  |  |  |
| Bismuth catalyst | Borchi Kat 24 |  |  |  |
| (B): Aminosilanes | KBE-903 (3-aminopropyltriethoxysilane) | 13.5 | 13.5 | 10.0 |
|  | KBM-903 (3-aminopropyltrimethoxysilane) |  |  | 3.5 |
| Total amount |  | 100 | 100 | 100.0 |
| A + B | Proportions (mass %) relative to total of A, B, | 55% | 55% | 55% |
| Acrylate oligomers + acrylate monomers | acrylate oligomers and acrylate monomers | 45% | 45% | 45% |
| Acrylate oligomers:acrylate monomers | Mass ratio | 61:39 | 61:39 | 61:39 |
| Weather resistance evaluation 1 (gloss retention) |  | 71% | 72% | 75% |
| Weather resistance evaluation 2 (coating film appearance) |  | ND | ND | ND |
| Flex resistance (mandrel minimum diameter) |  | 3 mm | 3 mm | 3 mm |
| Interval adhesion (residual area percentage (%)) |  | 90% | 90% | 90% |
| Film hardness (pencil hardness) |  | 2H | 2H | 2H |

*The reactive diluents contained in the materials such as the urethane acrylate oligomer (C)-containing compositions are classified as acrylate monomers.

TABLE 4

|  |  |  |  | Comp. Ex. 1 | Comp. Ex. 2 | Comp. Ex. 3 |
|---|---|---|---|---|---|---|
| Base resin | (A): Silicone resins | KR-510 |  | 38.3 | 11.0 | 21.5 |
|  |  | KR-213 |  |  |  |  |
|  |  | KR-9218 |  |  |  |  |
|  | (C): Urethane acrylate oligomers | (C1)-Containing composition (HDDA 30%) |  | 9.1 | 40.0 |  |
|  | Other urethane acrylate oligomers | (C2)-Containing composition (IRR214-K 30%) |  |  |  |  |
|  | Acrylate monomers (D) and | (C3)-Containing composition (TPGDA 30%) |  |  |  |  |
|  | Other acrylate monomers | (C4)-Containing composition (TMPTA 30%) |  |  |  |  |
|  |  | KRM9187 (HDDA 20%) |  |  |  |  |
|  |  | EBECRYL 9270 |  |  |  |  |
|  |  | EBECRYL 204 (HDDA 25%) |  |  |  | 17.5 |
|  | Polyester acrylate oligomer | EBECRYL 810 |  |  |  |  |
|  | (D): Acrylate monomers and | HDDA (1,6-hexanediol diacrylate) |  | 3.6 | 1.0 | 11.0 |
|  | Other acrylate monomers | IRR214-K (tricyclodecanedimethanol diacrylate) |  |  |  |  |
|  |  | TPGDA (tripropylene glycol diacrylate) |  |  |  |  |
|  |  | TMPTA (trimethylolpropane triacrylate) |  |  |  |  |
|  | Coloring pigment | TIPAQUE PFC105 |  | 29.0 | 29.0 | 29.0 |
|  | Dispersant | BYK-111 |  | 1.0 | 1.0 | 1.0 |
|  | Anti-sagging agent | BYK-410 |  | 2.0 | 2.0 | 2.0 |
|  | Anti-sagging agent | A630-20X |  | 2.5 | 2.5 | 2.5 |
|  | Anti-foaming agent | BYK-1790 |  | 0.7 | 0.7 | 0.7 |
| Curing agent | Tin catalyst | NEOSTANN U-200 |  | 1.3 | 1.3 | 1.3 |
|  | Lithium catalyst | Borchers Deca Lithium 2 |  |  |  |  |
|  | Zinc catalyst | Borchi Kat 22 |  |  |  |  |
|  | Bismuth catalyst | Borchi Kat 24 |  |  |  |  |
|  | (B): Aminosilanes | KBE-903 (3-aminopropyltriethoxysilane) |  | 12.5 | 11.5 | 13.5 |
|  |  | KBM-903 (3-aminopropyltrimethoxysilane) |  |  |  |  |
|  | Total amount |  |  | 100 | 100 | 100 |
|  | A + B | Proportions (mass %) relative to total of A, B, |  | 80% | 35% | 55% |
|  | Acrylate oligomers + acrylate monomers | acrylate oligomers and acrylate monomers |  | 20% | 65% | 45% |
|  | Acrylate oligomers:acrylate monomers | Mass ratio |  | 50:50 | 68:32 | 61:39 |
|  | Weather resistance evaluation 1 (gloss retention) |  |  | 60% | 52% | 60% |
|  | Weather resistance evaluation 2 (coating film appearance) |  |  | Cracks: 2 (S2) | ND | blister: 2 (S2) |
|  | Flex resistance (mandrel minimum diameter) |  |  | 8 mm | 3 mm | 3 mm |
|  | Interval adhesion (residual area percentage (%)) |  |  | 70% | 45% | 70% |
|  | Film hardness (pencil hardness) |  |  | 2H | H | B |

|  |  |  |  | Comp. Ex. 4 | Comp. Ex. 5 | Comp. Ex. 6 | Comp. Ex. 7 |
|---|---|---|---|---|---|---|---|
| Base resin | (A): Silicone resins | KR-510 |  | 21.5 | 21.5 | 21.5 | 21.5 |
|  |  | KR-213 |  |  |  |  |  |
|  |  | KR-9218 |  |  |  |  |  |
|  | (C): Urethane acrylate oligomers | (C1)-Containing composition (HDDA 30%) |  |  |  |  |  |
|  | Other urethane acrylate oligomers | (C2)-Containing composition (IRR214-K 30%) |  |  |  |  |  |
|  | Acrylate monomers (D) and | (C3)-Containing composition (TPGDA 30%) |  |  |  | 25.0 |  |
|  | Other acrylate monomers | (C4)-Containing composition (TMPTA 30%) |  |  |  |  | 25.0 |
|  |  | KRM9187 (HDDA 20%) |  |  |  |  |  |
|  |  | EBECRYL 9270 |  |  |  |  |  |
|  |  | EBECRYL 204 (HDDA 25%) |  | 23.3 |  |  |  |
|  | Polyester acrylate oligomer | EBECRYL 810 |  |  | 17.5 |  |  |
|  | (D): Acrylate monomers and | HDDA (1,6-hexanediol diacrylate) |  | 5.2 | 11.0 |  |  |
|  | Other acrylate monomers | IRR214-K (tricyclodecanedimethanol diacrylate) |  |  |  |  |  |
|  |  | TPGDA (tripropylene glycol diacrylate) |  |  |  | 3.5 |  |
|  |  | TMPTA (trimethylolpropane triacrylate) |  |  |  |  | 3.5 |

TABLE 4-continued

|  |  |  | | | | |
|---|---|---|---|---|---|---|
|  | Coloring pigment | TIPAQUE PFC105 | 29.0 | 29.0 | 29.0 | 29.0 |
|  | Dispersant | BYK-111 | 1.0 | 1.0 | 1.0 | 1.0 |
|  | Anti-sagging agent | BYK-410 | 2.0 | 2.0 | 2.0 | 2.0 |
|  | Anti-sagging agent | A630-20X | 2.5 | 2.5 | 2.5 | 2.5 |
|  | Anti-foaming agent | BYK-1790 | 0.7 | 0.7 | 0.7 | 0.7 |
| Curing agent | Tin catalyst | NEOSTANN U-200 | 1.3 | 1.3 | 1.3 | 1.3 |
|  | Lithium catalyst | Borchers Deca Lithium 2 | | | | |
|  | Zinc catalyst | Borchi Kat 22 | | | | |
|  | Bismuth catalyst | Borchi Kat 24 | | | | |
|  | (B): Aminosilanes | KBE-903 (3-aminopropyltriethoxysilane) | 13.5 | 13.5 | 13.5 | 13.5 |
|  |  | KBM-903 (3-aminopropyltrimethoxysilane) | | | | |
|  | Total amount | | 100 | 100 | 100 | 100 |
|  | A + B | Proportions (mass %) relative to total of A, B, | 55% | 55% | 55% | 55% |
|  | Acrylate oligomers + acrylate monomers | acrylate oligomers and acrylate monomers | 45% | 45% | 45% | 45% |
|  | Acrylate oligomers:acrylate monomers | Mass ratio | 61:39 | 61:39 | 61:39 | 61:39 |
|  | Weather resistance evaluation 1 (gloss retention) | | 33% | 38% | 35% | 75% |
|  | Weather resistance evaluation 2 (coating film appearance) | | ND | ND | ND | ND |
|  | Flex resistance (mandrel minimum diameter) | | 4 mm | 4 mm | 4 mm | 12 mm |
|  | Interval adhesion (residual area percentage (%)) | | 90% | 90% | 90% | 60% |
|  | Film hardness (pencil hardness) | | 2H | H | 2H | 2H |

*The reactive diluents contained in the materials such as the urethane acrylate oligomer (C)-containing compositions are classified as acrylate monomers.

⟨Weather Resistance Test⟩

At an environmental temperature of 23° C., sandblasted steel panels (150 mm×70 mm×2.3 mm, at least Sa 2.5) were coated with epoxy resin anticorrosive paint "BANNOH 2000" (manufactured by CHUGOKU MARINE PAINTS, LTD.) as an undercoat paint with use of an air spray device (W-77 manufactured by ANEST IWATA Corporation) so that the dry film thickness would be about 200 μm. The wet films were dried for 1 day under environmental conditions where the temperature was 23° C. and the humidity was 55°. The undercoat films were then coated with the acrylic polysiloxane resin coating compositions obtained in Examples and Comparative Examples with use of the air spray device (W-77) so that the dry film thickness would be about 100 μm. The wet films were dried for 7 days under environmental conditions where the temperature was 23° C. and the humidity was 55%. Coated steel panels for outdoor exposure testing of weather resistance were thus prepared.

The coated steel panels were immobilized on an outdoor exposure rack for weather resistance testing (CHUGOKU MARINE PAINTS, LTD., Okinawa Exposure Test Institute, Uruma, Okinawa) so that the coating films were directed to the south at an angle of 45° relative to the horizontal level (the ground) in accordance with JIS K5600-7-6:2002. The coated steel panels were exposed outdoors for 3 years.

Evaluation 1

To numerically evaluate the degradation of the coating films after the exposure, the gloss retention was measured in accordance with JIS K5600-4-7:1999. 60% or higher gloss retention was rated as good.

Evaluation 2

To visually evaluate the degradation of the coating films after the exposure, the coating films were inspected for blister s and cracks in accordance with JIS K5600-8-1:2014. The weather resistance was evaluated as good when the ratings of the amount and size of defects on the coating film were each 1 or less, and was evaluated as poor when the ratings were each 2 or more. "ND" means that there were no defects such as crack or blister on the coating film and the ratings were 0.

⟨Flex Resistance Test⟩

At an environmental temperature of 23° C., the acrylic polysiloxane resin coating compositions obtained in Examples and Comparative Examples were applied onto tin plates (100 mm×50 mm×0.3 mm) with an applicator so that the dry film thickness would be about 100 μm. The wet films were dried for 30 days under environmental conditions where the temperature was 23° C. and the humidity was 55%. Coated steel panels for flex resistance testing were thus prepared.

The coated steel panels were tested in accordance with JIS K5600-5-1:1999 with use of a type-1 bending tester to determine the minimum diameter of a mandrel which did not cause the cracking of the coating film or the separation of the coating film from the substrate (the tin plate). The flex resistance was evaluated as good when the minimum mandrel diameter was 10 mm or less, and was evaluated as excellent when the minimum mandrel diameter was 4 mm or less.

⟨Interval Adhesion Test⟩

At an environmental temperature of 23° C., sandblasted steel panels (150 mm×70 mm×2.3 mm, at least Sa 2.5) were coated with epoxy resin anticorrosive paint "BANNOH 2000" (manufactured by CHUGOKU MARINE PAINTS, LTD.) as an undercoat paint with use of an air spray device (W-77 manufactured by ANEST IWATA Corporation) so that the dry film thickness would be about 200 μm. The wet films were dried for 1 day under environmental conditions where the temperature was 23° C. and the humidity was 55%. The undercoated panels were set on an outdoor exposure rack (CHUGOKU MARINE PAINTS, LTD., Research Center in Otake City) and were exposed outdoors for 90 days. Here, the undercoated panels were immobilized on the outdoor exposure rack so that the undercoat film was directed to the south at an angle of 45° relative to the horizontal level (the ground). Hereinafter, the term "outdoor exposure" means that the film was exposed outdoors under the same conditions as described herein.

The coated panels that had been exposed outdoors were lightly rinsed with water and were dried. Thereafter, the undercoat films were coated with the acrylic polysiloxane resin coating compositions obtained in Examples and Comparative Examples with use of an applicator so that the dry film thickness would be about 100 μm. The wet films were dried for 7 days under environmental conditions where the temperature was 23° C. and the humidity was 55%. Coated steel panels for interval adhesion testing were thus prepared.

The coated steel panels for interval adhesion testing were exposed outdoors for 90 days. After the exposure, the coated steel panels were rinsed with water, dried for 1 day under environmental conditions where the temperature was 23° C. and the humidity was 55%, and subjected to a cross-cut tape peel test (2 mm×2 mm, 25 squares).

In the cross-cut tape peel test, the surface of the coating film of the coated steel panel was cut along a cutter guide to a depth reaching the substrate, i.e., the steel panel, to draw six vertical lines and six horizontal lines. Thus, a grid pattern consisting of twenty five squares was fabricated. The intervals between the cuts were 2 mm. Next, Cellophane tape (registered trademark) was strongly pressed against the grid pattern in the coating film, and the Cellophane tape was peeled from an end thereof without stopping at an angle of about 60° relative to the coating surface. The interval adhesion was evaluated based on the residual area percentage (%) which was the percentage of the area of the squares that remained and attached relative to the area of the twenty five squares. The interval adhesion of the coating film was evaluated as good (acceptable) when the residual area percentage (%) was 80% or above.

⟨Film Hardness Test⟩

At an environmental temperature of 23° C., the acrylic polysiloxane resin coating compositions obtained in Examples and Comparative Examples were applied onto tin plates (150 mm×70 mm×0.3 mm) with an applicator so that the dry film thickness would be about 100 μm. The wet films were dried for 30 days under environmental conditions where the temperature was 23° C. and the humidity was 55%. Coated steel panels for film hardness testing were thus prepared.

The coated steel panels were tested in accordance with JIS K5600-5-4:1999 to measure the pencil hardness of the coating film and thereby to evaluate the film hardness. The film hardness was evaluated as practical when the pencil hardness was H or higher, and was evaluated as good when the pencil hardness was 2H or higher.

The invention claimed is:

1. An acrylic polysiloxane resin coating composition comprising:
 a silicone resin,
 a compound comprising:
  one or more functional groups capable of undergoing Michael addition reaction with an unsaturated double bond in an acryloyloxy group, and
  one or more alkoxy groups bonded to silicon,
 a trifunctional or polyfunctional aliphatic urethane acrylate oligomer having a cyclic structure, and
 a bifunctional acrylate monomer having no ether structures, with the exception of an ether structure in an acryloyloxy group, and having no aromatic rings,
 wherein a mass ratio of a total amount of the silicone resin and the compound to a total amount of all acrylate oligomers and all acrylate monomers is in a range of 40:60 to 70:30.

2. The acrylic polysiloxane resin coating composition according to claim 1, wherein the functional group capable of undergoing Michael addition reaction in the compound is a primary or secondary amino group.

3. The acrylic polysiloxane resin coating composition according to claim 1, wherein a weight average molecular weight of the trifunctional or polyfunctional aliphatic urethane acrylate oligomer is 700 to 6,000.

4. The acrylic polysiloxane resin coating composition according to claim 1, wherein the bifunctional acrylate monomer is at least one selected from the group consisting of an alkanediol diacrylate and an alicyclic skeleton-containing diacrylate.

5. The acrylic polysiloxane resin coating composition according to claim 1, wherein a mass ratio of all acrylate oligomers to all acrylate monomers in the composition is in a range of 60:40 to 75:25.

6. A coating film formed from the acrylic polysiloxane resin coating composition of claim 1.

7. The coating film according to claim 6, wherein the minimum diameter of a mandrel determined with respect to the coating film with a dry film thickness of 100 μm in accordance with JIS K5600-5-1:1999 is not more than 10 mm.

8. The coating film according to claim 6, wherein the minimum diameter of a mandrel determined with respect to the coating film with a dry film thickness of 100 μm in accordance with JIS K5600-5-1:1999 is not more than 4 mm.

9. A substrate with a coating film, comprising a substrate and the coating film described in claim 6.

10. The substrate with a coating film according to claim 9, wherein the substrate is an iron or steel structure.

11. A method for producing a substrate with a coating film, the method comprising:
 applying the acrylic polysiloxane resin coating composition of claim 1 to a substrate to produce a substrate with an applied coating composition, and
 drying the substrate with the applied coating composition to form the substrate with a coating film.

* * * * *